(12) United States Patent
Sikora

(10) Patent No.: US 7,889,327 B2
(45) Date of Patent: Feb. 15, 2011

(54) METHOD FOR NON-CONTACT MEASUREMENT OF THE VELOCITY AND/OR THE LENGTH OF AN EXTRUDATE MOVED IN THE LONGITUDINAL DIRECTION, OF A CABLE IN PARTICULAR

(75) Inventor: Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 21 days.

(21) Appl. No.: 12/541,536

(22) Filed: Aug. 14, 2009

(65) Prior Publication Data

US 2010/0045968 A1   Feb. 25, 2010

(30) Foreign Application Priority Data

Aug. 21, 2008   (DE) .................. 10 2008 039 025

(51) Int. Cl.
*G01P 3/36* (2006.01)
*G01B 11/24* (2006.01)

(52) U.S. Cl. ................... 356/27; 356/28; 356/638
(58) Field of Classification Search .............. 356/27, 356/28, 603, 638
See application file for complete search history.

(56) References Cited

U.S. PATENT DOCUMENTS

| 4,854,707 | A  | * | 8/1989  | Ring et al. ............... 356/496 |
| 4,978,223 | A  | * | 12/1990 | Kutchenriter et al. ....... 356/638 |
| 6,922,254 | B2 | * | 7/2005  | Blohm et al. .............. 356/638 |
| 7,259,873 | B2 | * | 8/2007  | Sikora et al. .............. 356/638 |
| 2008/0043907 | A1 | * | 2/2008 | Sikora ..................... 378/54 |

FOREIGN PATENT DOCUMENTS

EP   0924493 A1   6/1999

* cited by examiner

*Primary Examiner*—Isam Alsomiri
(74) *Attorney, Agent, or Firm*—Vidas, Arrett & Steinkraus, P.A.

(57) ABSTRACT

A method for non-contact measurement of the velocity and/or the length of an extrudate moved forward in the longitudinal direction, in particular of a cable during the production.

9 Claims, 4 Drawing Sheets

METHOD FOR NON-CONTACT MEASUREMENT OF THE VELOCITY AND/OR THE LENGTH OF AN EXTRUDATE MOVED IN THE LONGITUDINAL DIRECTION, OF A CABLE IN PARTICULAR

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention is related to a method for non-contact measurement of the velocity and/or the length of an extrudate moved forward in the longitudinal direction, in particular of a cable.

There is a high demand to measure the length of produced extrudates accurately, like for instance of wires, cables, pipes or tubes. For instance, a sheathing insulation plant produces cables having a value of about 30 million € per year. Every saving with respect to the produced amount means an additional added value. For instance, 30 000,00 € can be saved if the produced length can be reduced about 0.1%.

It is known to perform a non-contact length measurement on extrudates or webs after the principle of frequency shift (Doppler Effect). In the measurement of so-called web material, like paper, steel plate, fabrics or the like, this method has outstandingly proven its worth. However, there are problems with length measurements on extrudate-shaped products like cables for instance.

Therefore, the present invention is based on the objective to provide a method for non-contact measurement of the velocity and/or the length of an extrudate moved forward in the longitudinal direction, in particular of a cable, by which accurate measurement results can be obtained that are as free of errors as possible.

The present invention starts from the finding that a diffraction pattern which is generated by a limited length of the edge of the extrudate is characteristic for this length portion of the extrudate and differs from diffraction patterns that are caused by subsequent length portions of the extrudate. When it is detected, with the aid of the receiving surfaces of a suitable image sensor and by analysing the diffraction pattern, that an once acquired diffraction pattern or a characteristic trait of the diffraction pattern, respectively, appears again at a spatially remote location, the velocity in which the extrudate has covered the path between the first and the second location can be determined from the time that passes between the first acquisition of the diffraction pattern and its coincidence with a diffraction pattern acquired at the second location, and the distance of the locations. By continuously repeating the described process, the extrudate velocity can be determined at every point in time, and an accurate length determination can be performed by way of this, even when velocity fluctuations occur during the advancing.

The utilisation of diffraction patterns for purposes of measurement has become known from EP 0 924 493. In the known measurement method, the diameter of an extrudate, of a cable with small diameter in particular, is determined by directing a fan-shaped beam of a monochromatic, punctiform light source to the extrudate, transversely to the same. The shadow of the extrudate is projected onto a row-shaped light sensitive sensor of per se known construction. The measured signals of the sensor, caused by diffraction, yield information about the position of the diffraction edge in the measurement space. Due to diffraction phenomena, geometric shadow boundaries do not result directly from the intensity distribution of the radiation hitting the sensor indeed; however, they can be derived from the resulting diffraction fringes. In the invention, the diffraction patterns, i.e. characteristic traits of the measured intensity distributions, are used for marking length units of the surface of an extrudate, in order to determine in which period of time the marked surface moves from a first to a second location. The arrival on the second location is detected by a sufficient coincidence of characteristic traits of a diffraction pattern acquired at the first location with characteristic traits of a diffraction pattern acquired at the second location. A correlation between first and second diffraction patterns or their characteristic traits, respectively, is preferably determined with the aid of the so-called cross correlation function. In signal analysis, the cross correlation function is used for describing the correlation between two signals at different time shifts between the signals, as is well known.

BRIEF SUMMARY OF THE INVENTION

In the method of the present invention, a first optical beam is directed transversely to the extrudate at one side thereof. The beam is received by a first receiving surface of a first image sensor on a preset first location on the opposing side of the extrudate. Diffraction takes place on the edge of the extrudate, and corresponding diffraction patterns, —i.e. intensity distributions of the received radiation—are represented on the shadow boundaries on the first receiving surface. The diffraction patterns are acquired and analysed. The diffraction pattern has a typical distribution, for instance several maxima that diminish continuously. The position of a maximum on the image sensor is characteristic for the contour of the extrudate at the observed location. Therefore, one or several maxima can be used for analysing the respective diffraction patterns. It is also conceivable to determine and observe the respective shadow boundaries accurately from the diffraction pattern by calculation. In every case, the illuminated contour of the edge of the extrudate can be characterised by analysing the diffraction pattern, even when surface unevenness can no more be discerned with the naked eye. Thus, the present invention utilises characteristics derived from the diffraction patterns in order to obtain surface traits for the extrudate, and it can be determined in which time a surface trait has covered a certain path. From this, the velocity can be determined.

For the indicated purpose, a second optical beam, running transversely to the extrudate like the first beam, is directed to a second receiving surface of the first or of a second image sensor, said second receiving surface being arranged on a second location at the same side as the first receiving surface which is spaced apart from the first location of the first receiving surface in the advancing direction of the extrudate.

It will be understood that one single light source may be used whose beam hits the first as well as the second receiving surface. However, it is also possible to provide separate light sources, which are arranged at a distance in the longitudinal direction of the extrudate. To this will be incurred farther below.

On the second receiving surface, diffraction patterns are also represented on the shadow boundary, which are also acquired and analysed, as has already been explained above.

In an evaluation device, it is determined after which span of time characteristic traits of a diffraction pattern acquired on the first receiving surface correlate approximately with characteristic traits of a second diffraction pattern acquired on the second receiving surface. The advancing speed of the extrudate, and from this the advanced length of the extrudate, is determined from the distance of the receiving surfaces or the representation locations of the traits of first and second diffraction patterns on the receiving surfaces, respectively, and the time span.

As compared to a focussing optical analysis of the surface of an extrudate, the present invention offers the advantage that no optics is necessary. A corrected optics permits no resolution below 5 μm, is therefore limited in its precision, disregarding the expense for it. The present invention needs no focussing and provides a high resolution. Therefore, in the invention minimal surface changes are sufficient to detect and to mark them via diffraction patterns anyhow. Changes of the distance of the extrudate from the light source or the image sensor, respectively, result in different expansions of the diffraction patterns, but do not change their characteristic traits.

In the method of the present invention, preferably two images sensors are used, whose receiving surfaces feature rows and columns. Suitable high-resolution image sensors are commonly known. They have 1280×1024 pixels, for instance. The images sensors are arranged in a distance of 50 mm, for instance. However, it is also possible to use one single image sensor, and to select the first and the second location of the acquirement of the diffraction patterns spatially spaced apart on the receiving surface of the single image sensor. Of course, the distance between the reception locations is small in this case.

It is conceivable to generate the first and the second light beams, which generate diffraction patterns on the receiving surfaces by way of an edge of the extrudate, with the aid of one single light source. According to one embodiment of the present invention, a first and a second divergent beam of punctiform light sources spaced apart in the longitudinal direction are used. As is well known, punctiform light sources generate a fan-shaped beam. Punctiform light sources are for instance suitable semiconductor lasers, which generate an essentially monochromatic light. Optical means between the punctiform light sources and the image sensors can be omitted. The apparatus expense for performing the method of the present invention is pretty small.

The light of the optical beam can lie in the visible or in the adajcent invisible region of the spectrum.

According to a further embodiment of the present invention, the triggering of the image sensors takes place such that the first and the second diffraction pattern are acquired with a preset frequency, and their characteristic traits are memorised. When the advancing velocity of the extrudate is known, it can be indicated approximately how much time it takes for the diffraction pattern that has been generated at the first location, or for characteristic traits thereof, respectively, to correlate at the second location with the diffraction pattern that has been generated there, or with characteristic traits thereof, respectively. However, the location of the correlation on the second receiving surface can vary, and it depends on the real velocity or the real length of the extrudate, respectively, which cannot be determined sufficiently accurately with usual velocity measurement devices, like tachometers or the like. Thus, the location of the coincidence or correlation, respectively, of diffraction patterns on the second receiving surface has mostly an offset against a reference line, a central line of the receiving surface for instance, in case that this is not purposefully prevented. Therefore, one embodiment of the present invention provides that the acquisition of the second diffraction patterns takes place with a phase shift with respect to that of the first diffraction patterns, wherein the magnitude of the phase shift corresponds to the distance in time which the location of coincidence of the characteristic traits of the first diffraction patterns with those of the second diffraction patterns on the second receiving surface features from a central- or reference line on the second receiving surface. If parallel light would be used for the second beam, any phase shift would not be necessary, because the location of the coincidence of first and second diffraction patterns or the characteristic traits thereof, respectively, could be determined without error by way of the columns of the image sensor without further ado. On the contrary, with a fan-shaped beam there are of course errors in the distance to the central axis of the fan-shaped beam, so that a measurement becomes more accurate when the location of the correlation is placed into the centre of the second receiving surface or to a reference line of the receiving surfaces aligned to the central axis as far as possible, or to a location which coincides with the axis of the fan-shaped beam or the punctiform light source, respectively.

The method of the present invention can also be used in order to determine whether an extrudate moves, for instance in the start of production. For this purpose, it is determined with the aid of the first image sensor or the first receiving surface, respectively, and the evaluation device, whether diffraction patterns spaced apart in time or characteristic traits thereof, respectively, feature a spatial shift with respect to each other. If this is the case, a movement of the extrudate can be detected, and also the direction of this movement.

More or less flexible extrudates, like cables for instance, have a slack in their production or for instance when being wound up, on a roller for instance, by which the length of the extrudate between two spaced apart locations is increased. Therefore, one embodiment of the present invention provides that the extrudate is moved approximately horizontally, and the optical beam is directed against the lower edge of the extrudate. Thus, the real length of the extrudate is measured independently from the slack.

BRIEF DESCRIPTION OF THE SEVERAL VIEWS OF THE DRAWINGS

The present invention will be explained in more detail below by way of an example of its realisation, represented in drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
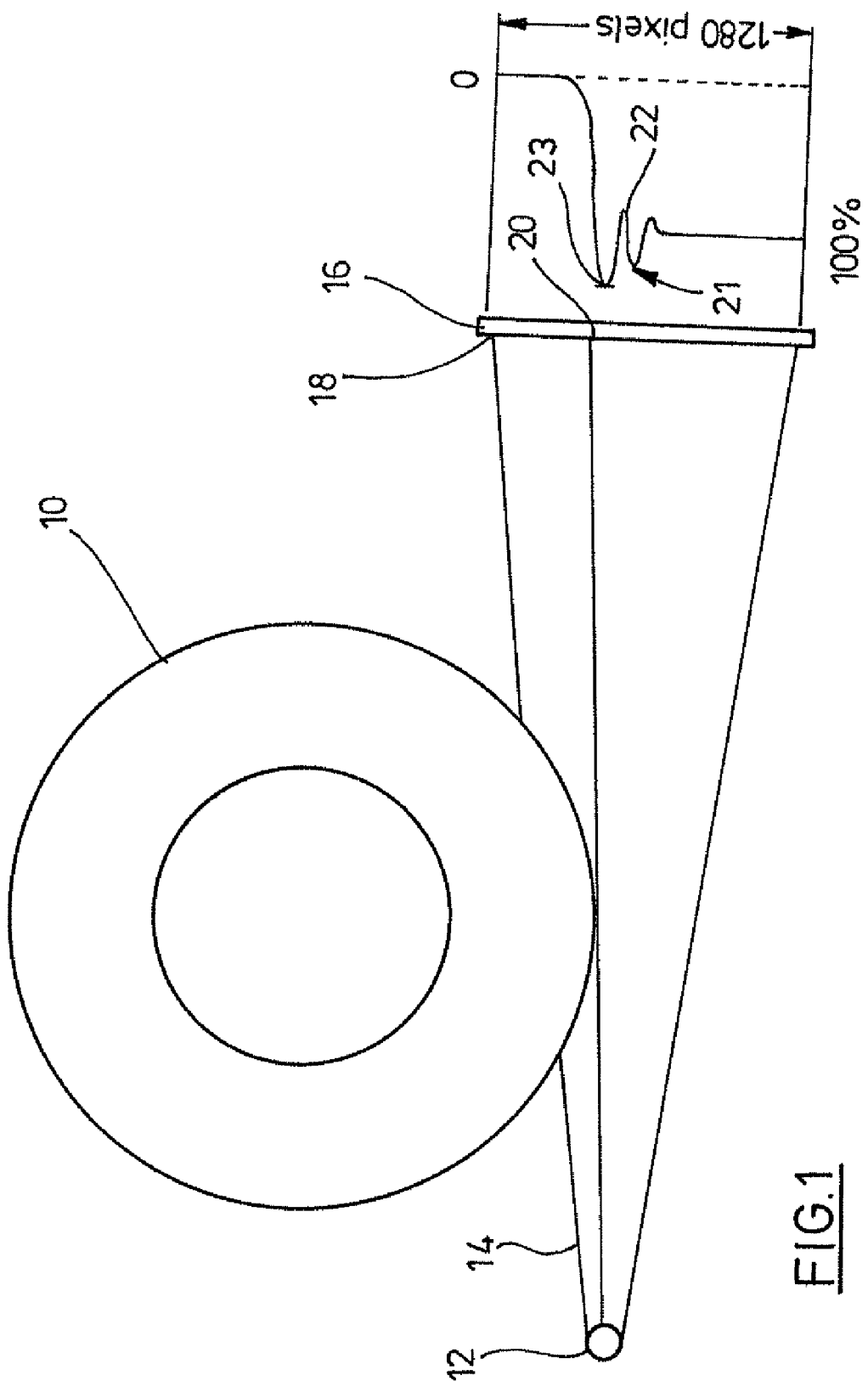
FIG. 1 shows the arrangement of a punctiform light source and of an image sensor with a measurement axis transverse to a cable in a schematic view, and a diffraction pattern in the shown measurement plane.

In FIG. 1, a cable 10 is shown, whose axis stands perpendicular to the drawing plane. A punctiform light source 12, a semiconductor laser for instance, generates a fan-shaped beam 14, which is directed transversely to the axis of the cable 10. A shadow 18 is represented on an image sensor 16, which has for instance columns with 1280 pixels and rows with 1024 pixels. On the shadow boundary at 20, there is a diffraction, which is characterised by the intensity distribution of the received light indicated at 21. The shown distribution 21 takes place within one column of the image sensor 16, which has for instance 1024 columns perpendicular to the drawing plane. The first maximum is shown at 23. At 22 there is a first minimum. The real shadow boundary is at the transition from the darkness amplitude to the first maximum of the diffraction fringe.

Figure 2:
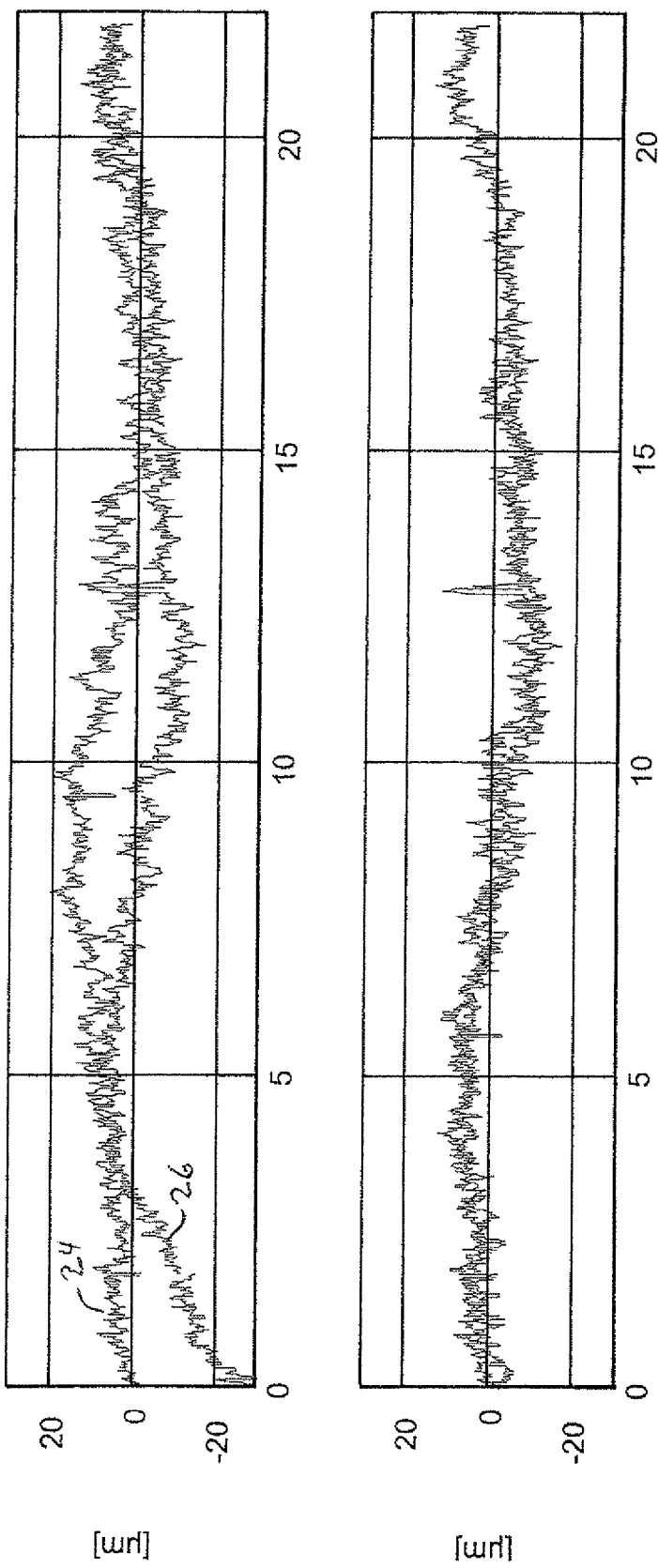
FIG. 2 shows the distribution of for instance first maxima of diffraction patterns, which have been generated by length portions of the cable after FIG. 1, namely on spaced apart locations on an image sensor.

The diffraction pattern depends on the nature of the surface of the cable sheathing, i.e. on its contour. Even when the same is very smooth, it has nevertheless a certain unevenness or structure, which can be acquired with a high-resolution image receiver and diffraction effects. At the topside of FIG. 2, the distribution of the first maxima of a first diffraction pattern is indicated at 24, and at 26 the distribution of the first maxima of a second diffraction pattern. The diffraction patterns are caused at different points in time by the same length portion of the cable. As both diagrams stem from the same surface portions, they can be brought approximately into coincidence by shifting, as shown in FIG. 2 at the downside. In order to produce the correlation, both diagrams 24, 26 must be shifted about around 340 columns on the area of the image sensor 16, which corresponds to a distance of 3.8 mm.

Figure 3:
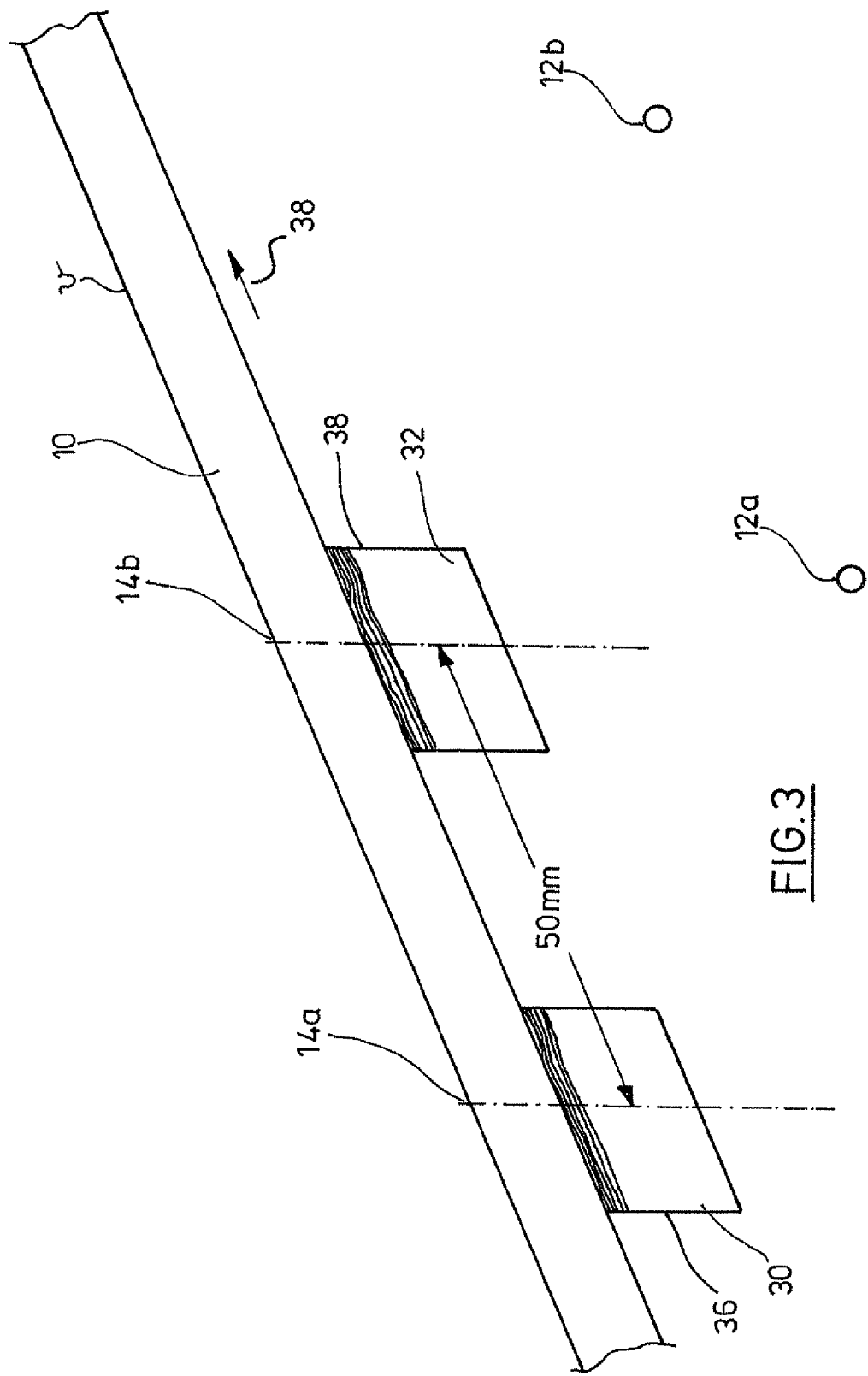
FIG. 3 shows an arrangement for performing the method of the present invention.

In FIG. 3, the cable 10 can be recognised again, as well as a first punctiform light source 12a and a second punctiform light source 12b in spacing from each other, this spacing running parallel to the longitudinal direction of the cable 10. The light source 12a generates a first fan-shaped beam 14a, and the second light source 12b generates a second fan-shaped beam 14b. The punctiform light sources 12a and 12b are in turn formed by a semiconductor laser. On the side of the cable 10 opposite to the light sources 12a and 12b, image sensors are arranged, which are indicated by their receiving surfaces 30, 32. The distance of the central lines of the receiving surfaces 30, 32 of the image sensors is indicated to be 50 mm. The punctiform light sources 12a and 12b form diffraction patterns on the receiving surfaces 30, 32 at the lower edge of the cable 10, as shown at 36 and 38, respectively. The cable 10 is advanced with a velocity v in the direction of the arrow 38. The velocity can be measured with the aid of a suitable velocity measurement device, for instance with a tachometer on the haul-off caterpillar or the like. However, the measured velocity value $v_m$ is not sufficiently accurate.

The diffraction pattern represented on the receiving surface 30 appears also on the second receiving surface 32, when the associated surface portion of the cable 10 has reached the second receiving surface 32. The represented diffraction patterns are characterised by certain traits, for instance by their first maxima, by a plurality of minima, and maxima with decreasing amplitude, by the accurate shadow boundary determinable by calculation or the like. In case that it is determined how much time it has taken for the diffraction pattern 36, i.e. its characteristic trait, to reach a certain second location on the second receiving surface 32 from a certain location on the first receiving surface, the accurate velocity v of the cable 10 can be determined from this, because the distance of the receiving surfaces 30, 32 or the defined locations, respectively, is known.

The coincidence of the diffraction patterns or the correlation of their characteristic traits, respectively, can be determined with the aid of the cross-correlation function. No 100% coincidence is required, but only one as great as possible, which ensures that the diffraction pattern acquired on the first receiving surface 30 is that one which coincides in a high degree with the diffraction pattern represented on the receiving surface 32, and consequently the surface locations of the cable on the first and the second receiving surface are coincident. Therefore, the location of coincidence has the geometric distance from the first location of the acquisition of the diffraction pattern or the characteristic trait thereof, respectively on the receiving surface 30.

In the measurement method described above, an acquisition of the diffraction patterns on the receiving surfaces 30, 32 is performed in time distances, preferably at preset frequency. From the velocity $v_m$ of the cable 10 measured in another way, the time window can be approximated in which the first diffraction pattern appears on the location of the second receiving surface 32. The exact location is determined in that the position of the coincidence of the characteristic traits on the receiving surface 32 is determined, which is possible without further problems with the aid of the columns of the receiving surface of the image sensor, this location having at least a distance to a central- or reference line. This offset is not critical in the determination of the velocity v when parallel rays are projected onto the cable and the image sensors. However, in the present case fan-shaped beams are provided, and the acquisition of the diffraction patterns in a location with offset to the central line of the second receiving surface, for instance, results in an inaccurate measurement according to the circumstances. In order to mitigate this disadvantage, the acquisition of the diffraction patterns takes place on the second receiving surface with a phase shift with respect to the acquisition of the diffraction patterns on the first receiving surface. This phase shift results from the offset which the determined location of coincidence of the first and the second diffraction pattern has with respect to this central line. For instance, if this offset is in the direction of the first receiving surface, the acquisition of the diffraction pattern on the second receiving surface is a little bit delayed, whereby the location of acquisition of the second diffraction patterns is approximately in the region of the central line.

Figure 4:
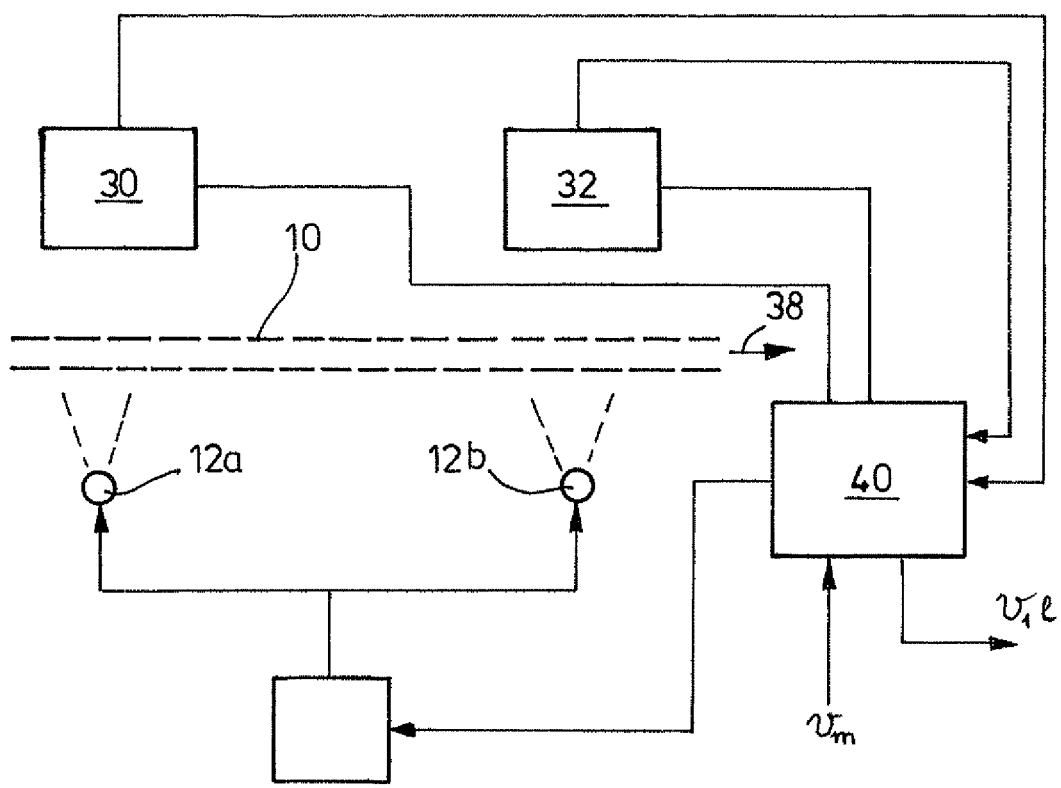
FIG. 4 shows a block diagram with respect to the method of the present invention.

The cable 10 is indicated by dashed lines in FIG. 4. Moreover, the receiving surfaces 30, 32 according to FIG. 3 can be recognised and also the punctiform light sources 12a and 12b. The image signals of the receiving surfaces 30, 32 or the image sensors, respectively, go to an evaluation device 40. The image sensors are triggered with a preset frequency by the evaluation device 40, wherein as mentioned, the image sensor with the receiving surface 32 is activated with a phase shift, corresponding to the spatial offset of the coincidence of the first and second diffraction patterns with respect to a central- or reference line on the second receiving surface 32. The analysis of the represented diffraction patterns takes place in the evaluation device 40, for instance with respect to the first maxima, through which the characterisation of the respective surface portion of the cable sheathing results. Further, the evaluation device determines a correlation of characteristic traits of the diffraction patterns as described, and from this the velocity v and by the latter the respective length of the cable 10.

The illumination of the lower edge of the cable allows for the normally occurring slack.

An evaluation of timely spaced first diffraction patterns or their characteristic traits, respectively, on the first receiving surface permits also the statement whether he cable is moved and into which direction. When the cable stands still, all the first diffraction patterns coincide. When it is moving, same diffraction patterns have a spatial distance from each other.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for non-contact measurement of the velocity and/or the length of an extrudate moved forward in the longitudinal direction, in particular of a cable during the production, with the following steps:
   a first optical beam is directed transversely to the extrudate at one side thereof and received by a first receiving surface of a first image sensor on a preset first location on the opposing side of the extrudate,
   at preset points in time, the first diffraction patterns represented at the shadow boundaries on the first receiving surface are analysed with respect to a specific trait characterising the surface contour, and the trait characterising the surface contour is memorised,
   a second optical beam directed transversely to the extrudate is directed to a second receiving surface of the first or of a second image sensor, said second receiving surface being arranged on a second location at the same side as the first receiving surface which is spaced apart from the first location of the first receiving surface in the advancing direction of the extrudate,
   second diffraction patterns represented at the shadow boundaries on the second receiving surface are analysed with respect to at least one trait characterising the surface contour,
   in an evaluation device, it is determined after which span of time a characteristic trait of a first diffraction pattern acquired on the first receiving surface correlates approximately with a characteristic trait of a second diffraction pattern acquired on the second receiving surface, and
   the advancing speed of the extrudate, and from this the advanced length of the extrudate is determined from the distance of the receiving surfaces or the representation locations, respectively, of the characteristic trait of the first and second diffraction patterns on the receiving surfaces and the time span.

2. A method according to claim 1, characterised in that a first and a second divergent beam of punctiform light sources spaced apart in the longitudinal direction of the extrudate are used.

3. A method according to claim 2, characterised in that the punctiform light sources are formed by semiconductor lasers.

4. A method according to claim 2, characterised in that the first and the second punctiform light source are directed to the extrudate without further optical means, and that no optical means are arranged between the extrudate and the image sensor.

5. A method according to claim 2, characterised in that the acquisition of the second diffraction patterns takes place with a phase shift with respect to that of the first diffraction patterns, wherein the magnitude of the phase shift corresponds to the distance in time which the location of coincidence of the characteristic traits of the first diffraction patterns with those of the second diffraction patterns on the second receiving surface features from a central- or reference line on the second receiving surface.

6. A method according to claim 1, characterised in that the receiving surfaces have light-sensitive rows and columns.

7. A method according to claim 1, characterised in that the first and the second diffraction pattern are acquired on the first and the second receiving surface with a preset frequency, and the correlation of characteristic traits of first and second diffraction patterns is determined in the evaluation device with the aid of the cross correlation function.

8. A method according to claim 1, characterised in that it is determined with the aid of the first image sensor or the first receiving surface, respectively, and the evaluation device, whether the extrudate is moved and in which direction, by determining whether first diffraction patterns spaced apart in time or characteristic traits of the diffraction patterns, respectively, feature a spatial shift with respect to each other.

9. A method according to claim 1, characterised in that the extrudate is moved approximately horizontally, and the optical beam is directed against the lower edge of the extrudate.

* * * * *